United States Patent [19]
Williams

[11] 3,934,410
[45] Jan. 27, 1976

[54] QUIET SHROUDED CIRCULATION CONTROL PROPELLER

[75] Inventor: Robert M. Williams, Chantilly, Va.

[73] Assignee: The United States of America as represented by the Secretary of the Navy, Washington, D.C.

[22] Filed: Sept. 15, 1972

[21] Appl. No.: 289,708

[52] U.S. Cl. ........................... 60/269; 415/DIG. 1
[51] Int. Cl. ................................................. F02k 3/00
[58] Field of Search ...... 415/DIG. 1, 219 B; 60/269, 60/229; 416/91; 114/12, 42, 126; 244/52, 73

[56] References Cited
UNITED STATES PATENTS

| | | | |
|---|---|---|---|
| 2,084,462 | 6/1937 | Stalker | 415/DIG. 1 |
| 2,393,933 | 1/1946 | Poole | 415/DIG. 1 |
| 2,998,700 | 9/1961 | Chaplin, Jr. | 415/DIG. 1 |
| 3,000,401 | 9/1961 | Ringleb | 415/DIG. 1 |
| 3,032,313 | 5/1962 | Szydlowski | 415/DIG. 1 |
| 3,230,702 | 1/1966 | Soulez et al. | 60/269 |
| 3,620,640 | 11/1971 | Lariviere | 415/215 B |
| 3,643,617 | 2/1972 | Holden | 114/126 |

FOREIGN PATENTS OR APPLICATIONS

| | | | |
|---|---|---|---|
| 934,141 | 8/1963 | United Kingdom | 416/91 |

*Primary Examiner*—Henry F. Raduazo
*Attorney, Agent, or Firm*—R. S. Sciascia; Q. E. Hodges

[57] ABSTRACT

The purpose of this invention is a propeller capable of generating high thrust at reduced noise levels, weight and drag. The propeller blades employ a tangential slot along the trailing edge of each propeller blade and circulation control blowing from the tangential slot over the trailing edge. Lift is generated by the coanda blowing. The lift is proportional to the momentum flow of the air out of the slot and is substantially independent of the rotational velocity. Additionally a circulation control shroud expands the thrusting slipstream of the propeller so that the shroud diffusion angle is increased and the average exit velocity is reduced, thereby increasing efficiency and reducing noise.

3 Claims, 6 Drawing Figures

QUIET SHROUDED CIRCULATION CONTROL PROPELLER

DESCRIPTION OF THE PRIOR ART

Existing state-of-the-art designs of propellers in helicopters and in conventional aircraft use a conventional air foil blade having a sharp trailing edge and approximately 12% thickness ratio. These propellers suffer the problems of high noise level caused by high tip mach numbers and the compressibility effect inducing "shock down" on blade tips, high vibration and fatigue loading caused by a combination of non-uniform inflow due to the main lifting rotor tip vortex in helicopters and dynamic-aeroelastic characteristics of high aspect ratio blades of thin cross section. In addition, these propellers suffer high drag at high forward speeds, high component weight and power requirements and in the case of a helicopter tail rotor, insufficient thrust is developed for transient maneuver conditions and when hovering in strong side winds.

SUMMARY OF THE INVENTION

This invention is directed towards a propeller using circulation control. The concept of circulation control is shown in connection with a lifting foil in U.S. Pat. No. 3,062,483.

In the device of the present invention, a propeller is mounted for rotation and employs a slot for coanda circulation control blowing along its trailing edge.

The propeller is characterized by a blunt trailing edge and air blown out the slot. The blown air curves down and around the trailing edge and discharges at a point on the opposite side of the propeller. Under the influence of the coanda blowing about the blunt edge, the stagnation point is moved further aft increasing the lifting force on the propeller. The point of separation of the air is determined by the intensity of blowing. Relocating the stagnation point further aft on the propeller produces a higher lift on the propeller, the lift being functionally related to the velocity of the blown air.

The propeller blade sections are of a high thickness ratio at the hub (approximately 50%) decreasing in thickness towards the tip to approximately 20%. This design produces an inherently strong and a lightweight structure. The blades may be of small cross sectional area because of the high lifting ability of the blades and they thereby present less area to the air stream and reduce drag and power requirements. The propeller blades may be used with a plurality of other blades to form a multiple bladed propeller, each blade being characterized by a reduced flow dimension and reduced cross sectional area.

The multiple propeller composed of a small blade raises the frequency of the transmitted noise thereby producing a reduced noise intensity as these higher frequency noise components are more readily attenuated in the atmosphere.

In addition, the propeller may be shrouded and the shroud may be designed with a circumferential recess which traps the closely spaced blade tip vortices and thereby removes the boundary layer at the shroud to effectively increase the shroud diffusion angle.

Alternatively, the propulsive shroud employs circulation control blowing over its blunt trailing edge, resulting in an increased or varying diffusion angle.

The shroud can serve an additional function when used about the tail rotor of a helicopter. In this application it shields the tail rotor from the main lifting rotor trailing vortex. This vortex is the primary source of higher frequency dynamic excitations.

The propeller blade can be structured for reverse blowing and can be driven by mechanical means or by the jet thrust of the air blown from the slot. Because the circulation control propeller develops a propulsive force substantially independent of rotational speed it is possible to develop thrust at extremely low rotor tip speeds (200 – 700 feet per second).

OBJECT OF THE INVENTION

The first object of the invention is to provide a shrouded circulation control propeller blade producing higher thrust than conventional propellers and at a reduced noise level.

A second object of this invention is to provide a multiple bladed propeller employing many small chord blades rather than a few large ones so that higher frequency noise components are generated which are more readily attenuated in the atmosphere.

A third object of this invention is to provide a shroud surrounding the propeller for capturing the blade tip vortex and allowing it to trail slowly aft, expanding the thrusting slipstream of the propeller so that the average exit velocity is reduced.

A fourth object of this invention is to provide a circulation control shroud employing a blunt edge and circulation control blowing for increasing the diffusion angle of the shroud.

A fifth object of this invention is to provide a shrouded propeller, employing reversible thrusting in opposite directions for use in maneuvering.

DESCRIPTION OF THE INVENTION

Figure 1B:
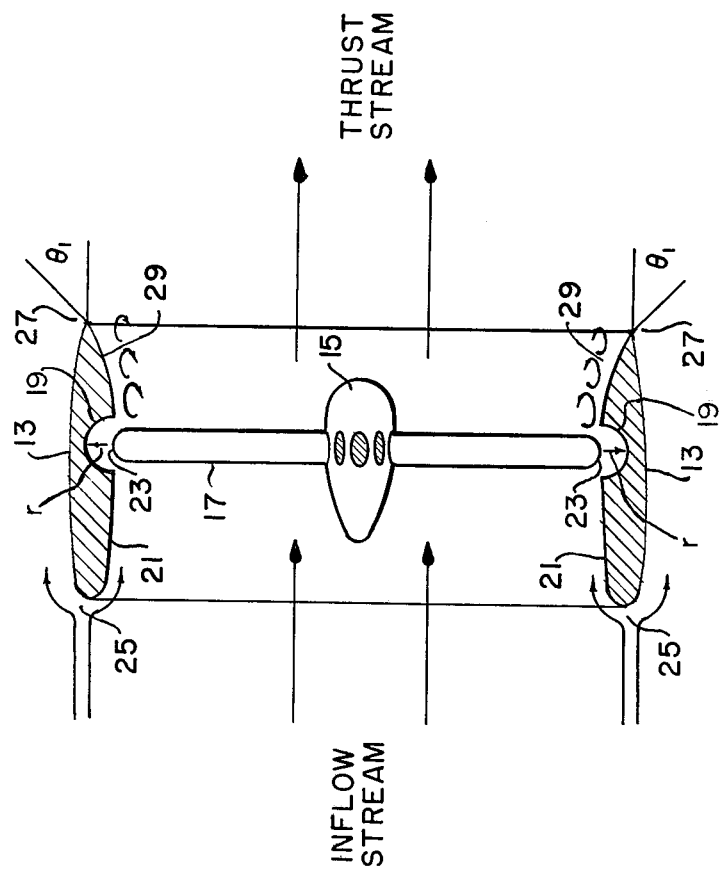
FIG. 1b is a cross sectional view of the shroud of FIG. 1a showing the curved recess extending circumferentially about the shroud and the exit diffusion angle $\theta_1$.
Figure 1A:
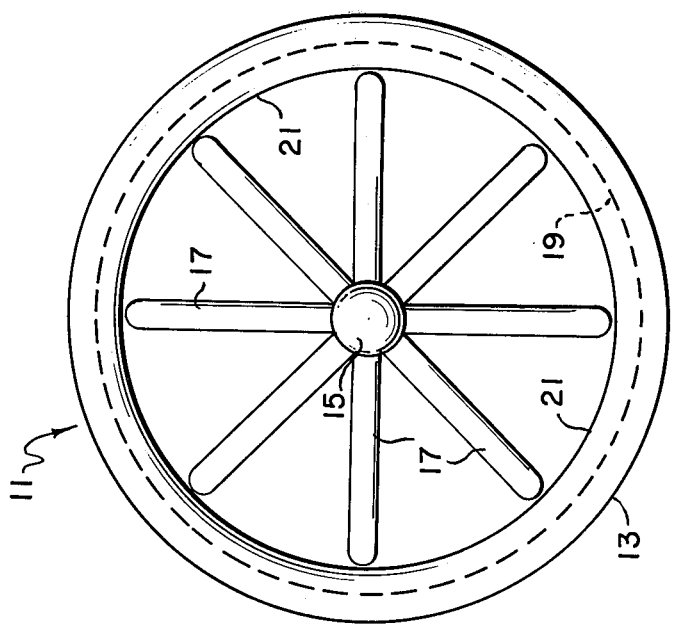
FIG. 1a shows in a front view a quiet shrouded circulation control propeller employing a circumferential recess to trap the tip vortices and slow their movement aft toward the shroud exit opening.

Referring now to FIG. 1a a first embodiment is shown. The shroud, 13, is circular in shape and surrounds the propeller mounted for rotation at rotational axis 15. The propeller comprises blades 17. Shown in FIG. 1a is recess 19 which extends circumferentially about the interior wall 21 of the shroud, 13.

Referring now to FIG. 1b, the shroud in FIG. 1a is shown in cross section. As shown in FIG. 1b the recess 19 has a radius of curvature r and its center is substantially at the point of travel of the blade tip 23. The radius of curvature is substantially equal to the size of the vortex generated by the blade tip as measured by the size of the vortex at its point of maximum velocity. This is more commonly known as the vortex core size. The inflowing stream is accelerated by the propeller 17 and this accelerated stream is labeled as the thrust stream on the outflow side of the propeller. The propeller 17 is supported at the hub 15 by stators in the standard manner such as shown in U.S. Pat. No. 2,929,580 issued on 22 Mar. 1960 to Ciolkosz. For the purpose of clarity the stators are not shown in the drawing. As indicated elsewhere in this specification the propeller may be driven by the thrust of the air blown out of the circulation control slots. Air is pumped through passages in the stator into the hub and into the propeller blades. The air may be supplied from a pump source into the propeller blades in the manner shown in U.S. Pat. No. 2,925,129 issued on 16 Feb. 1960 to Yuan et al. As in the Yuan et al disclosure the momentum flux from the slot can be varied by adjusting the output of the source.

The inflow stream expanding about the leading edge 25 of the shroud 13 produces an effect known as negative drag and induces a secondary propulsive effect.

The exit diffusion angle $\theta_1$ of the shroud is a physical dimension as shown in FIG. 1 and is a function of the structure of the shroud at its trailing edge 27. In normal use without the benefit of the circumferential recess 19, a boundary layer builds at the shroud surface 29 causing the thrust stream to diffuse at an angle less than $\theta_1$. With recess 19 the vortex generated by the propeller tip is temporarily trapped in the recess 19 and travels slowly aft at approximately the rate of the self induced vortex velocity. As it spirals towards the sharp trailing edge 27, it scrubs the boundary layer from the surface 29 and the thrust stream remains attached to the surface 29. The effect of this scrubbing and attachment of the thrust stream to surface 29 is an increase of the exit diffusion angle to substantially the structural diffusion angle $\theta_1$.

Figure 2A:
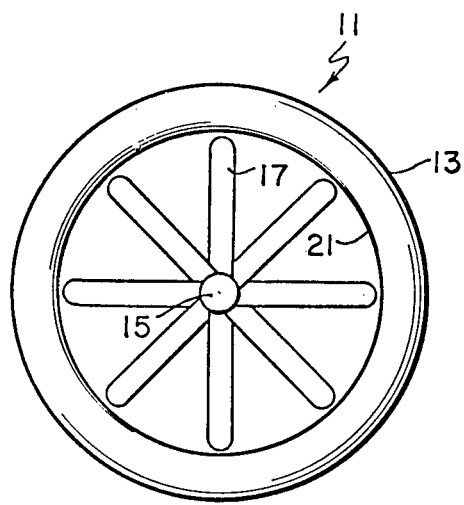
FIG. 2a shows a front view of the shroud employing circulation control blowing.
Figure 2B:
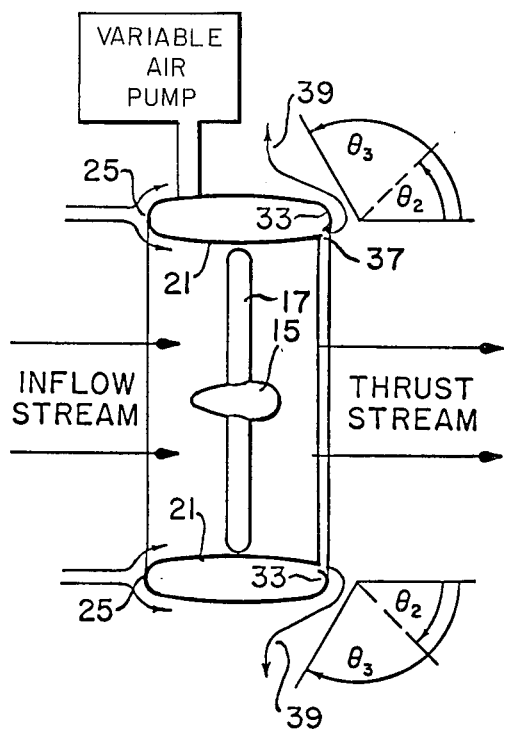
FIG. 2b shows a cross section of the shroud in FIG. 2a, exit diffusion angle $\theta_2$ and blown diffusion angle $\theta_3$.

Referring now to FIG. 2a, a second embodiment of this invention is shown and wherein the same numbers are used to designate similarly structured and similarly operating parts. As shown in FIG. 2a, a circular shroud 13 surrounds a multi-bladed propeller having blades 17 and rotating on axis 15. The shroud has an interior wall 21 and as shown cross section in FIG. 2b is substantially elliptic having a leading edge 25 and a blunt trailing edge 33. The blunt trailing edge has a circumferentially extensive slot 37 for coanda circulation control blowing over the blunt edge 33. The air blown out of slot 37 curves down around the blunt trailing edge and detaches at a point on the opposite side of the shroud, dependent upon the momentum flux of the blown air. The path of this air is shown by arrow 39.

The structural exit diffusion angle is represented by $\theta_2$. The effective diffusion angle, realized responsive to circulation control blowing is $\theta_3$. The effective increase in diffusion angle produced by circulation control blowing over blunt edge 37 is ($\theta_3-\theta_2$). Since the point of detachment of the blown air is dependent on its velocity, or momentum (flux), the diffusion angle $\theta_3$ may be varied by varying the momentum flux from slot 37.

The increase diffusion angle is produced by circulation control blowing from slot 37 adhering to the shroud's surface at its blunt edge and to its opposite side and detaching from the opposite side at a point dependent upon the momentum of the blown air.

The inflowing stream accelerates about leading edge 25 causing a thrust effect which adds to the propulsion force of the device. The inflow stream is accelerated by the rotating propeller 17 and the resultant thrust stream is directed towards the rearward shroud opening.

Figures 3A, 3B:
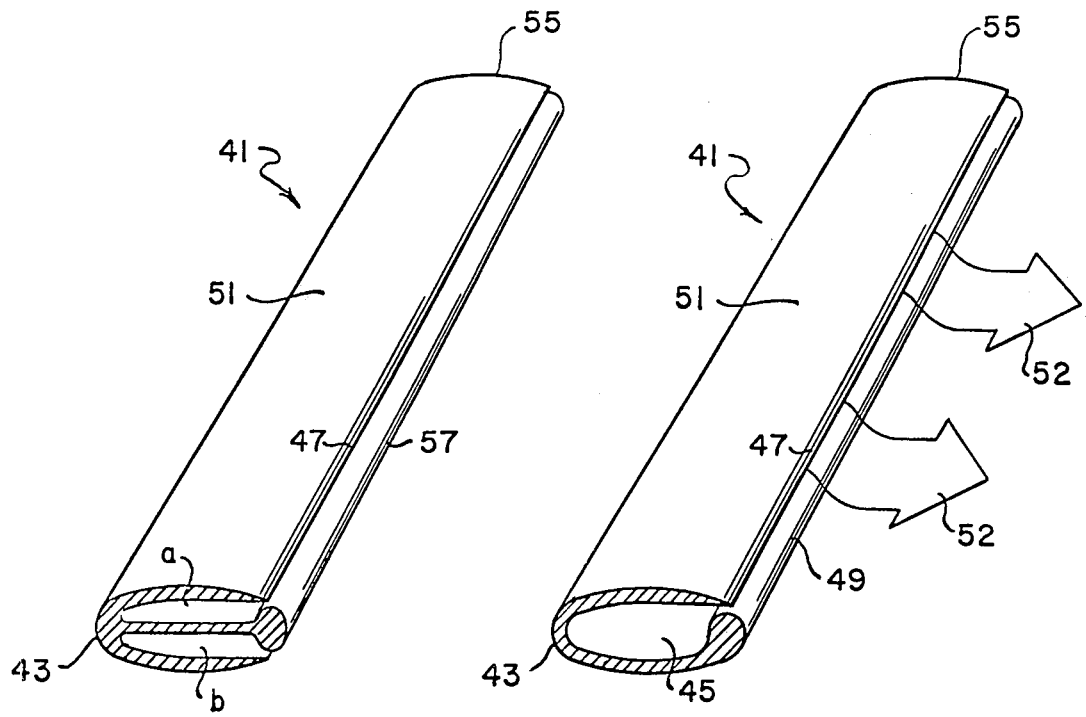
FIG. 3a shows the propeller blade used within the shroud as having a slot for circulation control blowing over its blunt edge.
FIG. 3b shows a modification of the blade in FIG. 2a with a slot exposed on each side of the blade for reversible thrusting.

The shroud can be used with a circulation control propeller as shown in FIG. 3a and 3b. In FIG. 3a, the circulation control propeller is designated generally by numeral 41 and has an elliptic shape as shown in cross section at its root 43. A plenum chamber 45 is supplied with air which is directed out slot 47 at blunt trailing edge 49. The direction of the air is shown by arrows 52. The blown air curves down and around the blunt edge and detaches at a point on the underside of the blade functionally related to the intensity of the blowing. The effect is to produce increased lift on surface 51 of the propeller and thereby increase the propulsive force produced. Additionally, the propeller can be driven by the force of the air directed from the slot without the need of mechanical machinery. A blade of the type shown in FIG. 3a may be used within the shroud and in a multi-bladed propeller unit employing small chord blades to raise the frequency of the generated noise and reduce the intensity of the transmitted noise.

The propeller blade sections are of a high thickness ratio at the hub or root 43 (approximately 50%) and decreases in thickness toward the tip 55 (approximately 20%). Because the thick sections can generate high lift, the blades can be made of a small chord dimension.

In conjunction with the shroud a multi-bladed propeller presents less area to the airstream and can be employed in such applications as a tail fan on helicopters. In such case, the propeller aspect ratio will be in the order of 10/1 to 15/1.

The blade of FIG. 3a shown in modified form in FIG. 3b where the same numbers are used to indicate the same or similar operating parts.

In FIG. 3a, the blade employs a single slot while in FIG. 3b, the symmetrical blade employs two slots, one on each side of the blade adjacent to its blunt edge. These slots are shown as 47 and 57 and slots are used in conjunction with chambers a and b respectively. The purpose of the double slots is to permit reversible thrusting. By closing the air supply to one of the chambers and supplying air to the other chamber, the direction of the propulsion force induced by this blade can be reversed and the blade can be used in maneuvering as when it is employed in the tail fan of a helicopter or it can be used to reverse thrust in a fixed wing aircraft and when the aircraft is landing and must be quickly deaccelerated.

The shroud used separately or in conjunction with the circulation control propellers is not limited to aircraft application but may be used in compressors so that compression is obtained in a minimum of stages, roughly one third as many as in present compressors. It may also be used in hover craft propulsion systems where large static thrust in a minimum area is desirable, in the marine propeller designs where reversible thrust is a distinct advantage and in pump design.

What is claimed is:

1. A quieting propeller shroud comprising:
    a fixed axially extending annular shroud for enclosing a propeller thrust stream and having an exit diffusion angle;
    a recess within said shroud, coextensive with the inside circumference of said shroud and having a circular cross-section to reduce the boundary layer at the interior of said shroud to substantially maintain the thrust stream diffusion angle at the shroud diffusion angle;

a propeller having a plurality of short chord blades having a generally elliptical shape mounted for a blowing slot adjacent the trailing edge of each blade for circulation control blowing over the smooth rounded surface edge and for developing thrust proportionately to the momentum flux of air out of said slot; and said recess has a radius of curvature "$r$" substantially equal in size to the vortex core generated at the propeller blade tip, and the recess centered about the vortex center generated by the propeller tip.

2. The quieting propeller shroud of claim 1, wherein:
each of said blades being substantially elliptical and of 50% thickness ratio at its root.

3. The shroud of claim 1, wherein:
each of said blades has a second slot for circulation control blowing disposed opposite said first slot and on the opposite side of said blade;

said propeller developing thrust in opposite directions along the axis of propeller rotation in response to air blown out of each said oppositely disposed slot.

* * * * *